US005305310A

United States Patent [19]

Itoh et al.

[11] Patent Number: 5,305,310
[45] Date of Patent: Apr. 19, 1994

[54] PACKET SWITCHING SYSTEM HAVING ARBITRATIVE FUNCTION FOR COMPETING PACKETS

[75] Inventors: Atsuo Itoh; Toshio Suzuki, both of Tokyo, Japan

[73] Assignee: NEC Corporation, Tokyo, Japan

[21] Appl. No.: 883,065

[22] Filed: May 8, 1992

Related U.S. Application Data

[63] Continuation of Ser. No. 495,464, Mar. 19, 1990, abandoned.

[30] Foreign Application Priority Data

Mar. 17, 1989 [JP]    Japan .................... 1-65304

[51] Int. Cl.[5] .................. H04J 3/26; H04Q 11/04
[52] U.S. Cl. .................... 370/60; 370/94.1;
                                     340/825.02; 340/825.52
[58] Field of Search ................ 370/58.1, 58.2, 58.3,
        370/60, 60.1, 61, 65, 67, 85.1, 85.2, 85.6, 85.9,
        92, 93, 94.1, 112; 340/825.02, 825.5, 825.51,
                                                    825.52

[56]              References Cited
          U.S. PATENT DOCUMENTS

| | | | |
|---|---|---|---|
| 4,754,451 | 6/1988 | Eng et al. .................... | 370/60 |
| 4,760,570 | 7/1988 | Acampora et al. ............ | 370/60 |
| 4,817,084 | 3/1989 | Arthurs et al. .............. | 370/94.1 |
| 4,891,803 | 1/1990 | Huang et al. ................ | 370/60 |
| 4,899,334 | 2/1990 | Shimizu ...................... | 370/60 |
| 4,967,405 | 10/1990 | Upp et al. .................. | 370/58.1 |

OTHER PUBLICATIONS

"A Wideband Digital Switch", Alan Huang et al., IEEE Global Telecommunications Conference Record, 1984, pp. 121–125.
"The Knockout Switch: A Simple, Modular Architecture for High-Performance Packet Switching", Y. S. Yeh et al., The Proceedings of the IEEE International Switching Symposium, 1987, pp. 0801–0808.

Primary Examiner—Douglas W. Olms
Assistant Examiner—Alpus H. Hsu
Attorney, Agent, or Firm—Laff, Whitesel, Conte & Saret

[57]              ABSTRACT

The invention switches and forwards information data packets when a plurality of the packets having the same address are competing for simultaneous attention. A plurality of sorting circuits are coupled in a hierarchial cascade. All competing packets are originally received by a superior circuit in the hierarchial cascade. It processes the packet which wins a competition for its attention and passes the rest of the non-winning packets down the hierarchial cascade for processing by an inferior circuit.

13 Claims, 10 Drawing Sheets

PACKET SWITCHING SYSTEM HAVING ARBITRATIVE FUNCTION FOR COMPETING PACKETS

This application is a division of application Ser. No. 07/495,464, filed Mar. 19, 1990, now abandoned.

BACKGROUND OF THE INVENTION

1. Field of the Invention

The present invention relates to a self-routing packet switching system.

2. Description of the Prior Art

In a prior art packet switching system, the address of a packet given from an input line is identified. Then the packet is supplied to an output line corresponding to the desired address. When a plurality of packets destined for the same address are simultaneously entered into such a packet switching system, the switching of the competing packets can be achieved in one of the following two methods. By one method, a sorting network and a routing network are combined. The competing packets are dropped and given appropriate delays in a later stage of the routing network. Then they are reentered into the same routing network as taught by Alan Huang et al. in an article entitled "A Wideband Digital Switch" published in 1984 in the IEEE Global Telecommunications Conference Record. By the other, a switch module having an n-input one-output selecting function is provided for each corresponding output line. Switching is accomplished so as to select the packet destined for a given output line from signals appearing on a bus comprising n-input lines as disclosed by Y. S. Yeh et al. in an article entitled "The Knockout Switch: A Simple, Modular Architecture for High-Performance Packet Switching" published in the Proceedings of the IEEE International Switching Symposium 1987.

The first method however, requires complex processing, such as time queueing, in order to avoid reversing of the sequence of the competing packets when they are reentered. The second method needs a number of n-input one-output (n is the number of input lines) switch modules which is equal to the number of output lines, which entails a large volume of hardware if many input and output lines are involved.

SUMMARY OF THE INVENTION

An object of the present invention is, therefore to provide a simple packet switching system capable of supplying each packet to the desired output line, even if a plurality of packets destined for the same address are entered simultaneously.

A packet switching system according to the invention is provided with:

on its input side, m-sorting modules each having sorting means for sorting a plurality of packets which are entered simultaneously according to the destination address; dropping means responsive to a plurality of competing packets having the same destination address among the packets sorted by the sorting means, said dropping means keeping one of the competing packets and dropping the rest to inferior sorting module; and routing means for routing each packet passed by the dropping means on a basis of the destination address, said m-sorting modules being sequentially connected so that the dropped output of said dropping means of a superior sorting module is routed the input to said sorting means of the immediately inferior sorting module, and buffer modules for temporarily storing the packets given from said routing means of said m-sorting modules and for supplying them to output lines of the packet switching system on a first-in first-out basis, each buffer module being connected to an output line corresponding to said destination address, whereby said plurality of packets are entered into the highest-positioned of said sorting modules, non-competing packets are distributed from said highest-positioned sorting module to the buffer modules corresponding to the output lines indicated by said destination addresses, and k-competing packets are entered into the same buffer module with prescribed delays, the entering being in a sequence from the highest-positioned sorting module to the k-th sorting module.

BRIEF DESCRIPTION OF THE DRAWINGS

The above object and features of the present invention will become more apparent from the following detailed description when taken in conjunction with the accompanying drawings, in which.

In the drawings, the same reference numerals denote the same constituent elements, respectively.

DESCRIPTION OF THE PREFERRED EMBODIMENT

Figure 1:
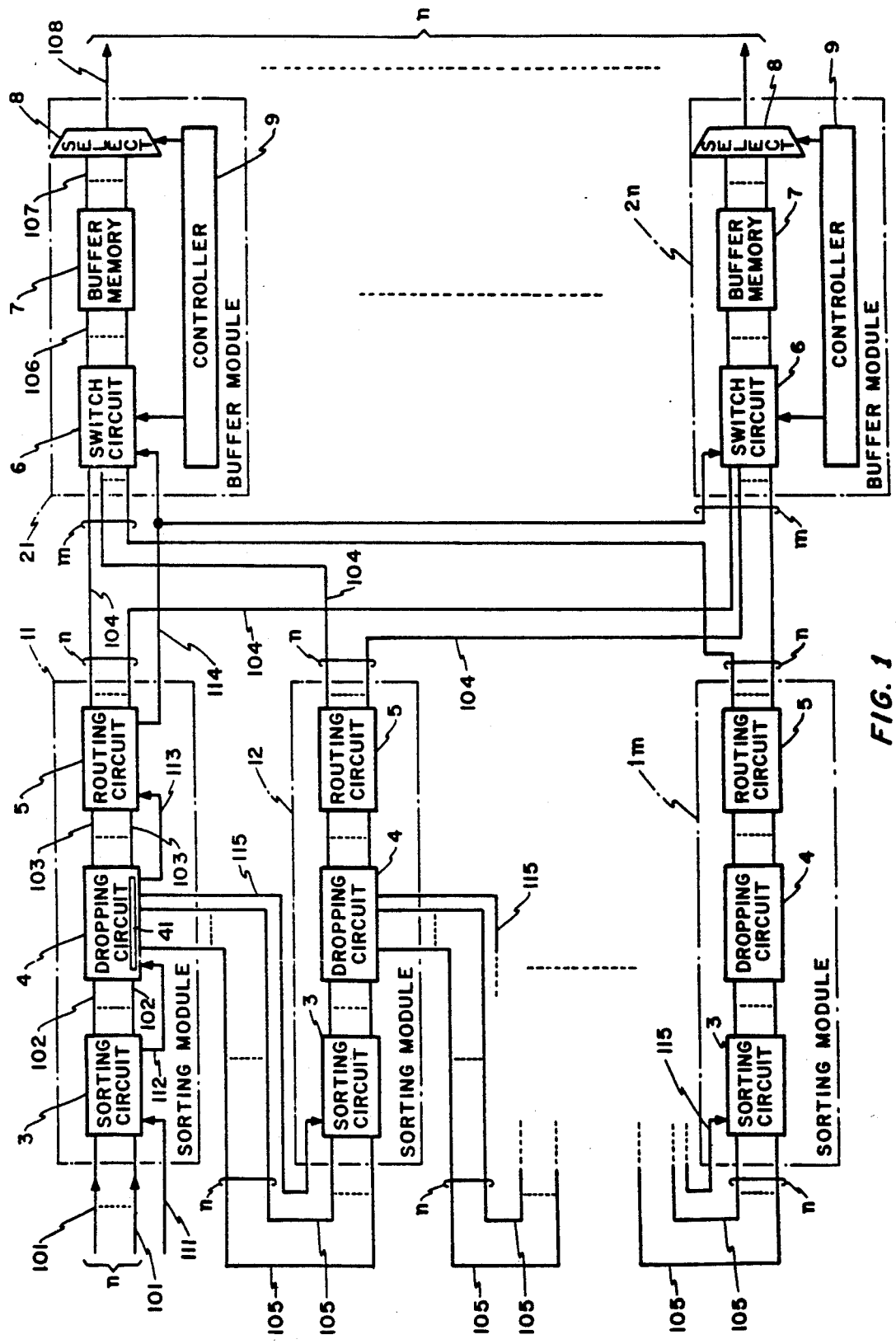
FIG. 1 is a block diagram of a preferred embodiment of the invention.

FIG. 1 is a block diagram of a preferred embodiment of the present invention.

FIG. 1 shows a packet switching system having a plurality (n) of input lines 101 and a plurality (n) of output lines 108. Information data packets are received on lines 101, each packet having a destination address. The system has a plurality (m) of sorting modules 11, 12, ...1m which are coupled in cascade, with module 11 in a superior position, module 12 in the next inferior position, and module 1m in the most inferior position.

Normally, all incoming data packets are processed by the superior sorting module 11. However, if a plurality of incoming packets having the same address are simultaneously competing for attention, the superior module processes the packet which won the competition and passes the remainder of the competing packets with the same address down to the next inferior module, which selects one packet on the basis of its having there won a competition for attention. That inferior module then passes the rest of the competing packets to the next inferior module where the process is repeated. Each module forwards the packet which it processes to the output line with a suitable time buffer storage to feed out all packets without collision therebetween. The packet switching system illustrated in FIG. 1 is composed of n-input lines 101, m-sorting modules 11 to 1m, n-output lines 108, and n-buffer modules 21 to 2n corresponding to each of the output lines 108.

Figure 1A:
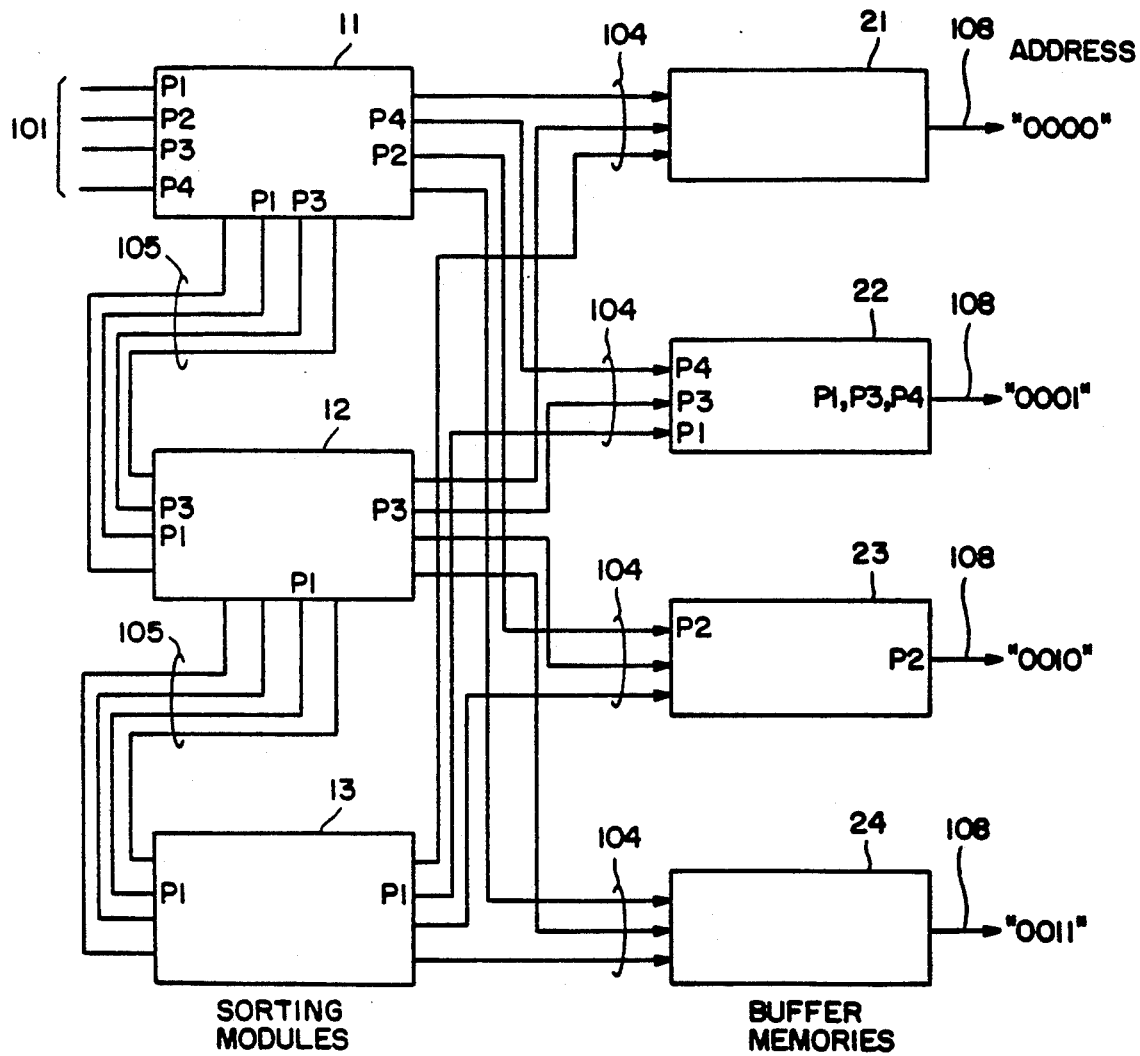
FIG. 1A is a more complete showing of the system of FIG. 1.

The addresses of each of the output lines 108 connected to each of the buffer modules 21 to 24 are shown in FIG. 1A as "0000", "0001", "0010" and "0011", respectively. In contrast, the addresses of the packets P1 to P4 might be "0001", "0010", "0001", and "0001", respectively, indicating that the packets P1, P3 and P4 are directed to the output line "0001" in group 108, which is connected to the buffer module 22 (i.e., the packets P1, P3 and P4 are in a competition to reach the same outgoing channel). Assume that, in the module 11, the packet P4 wins the competition and is output to the destination buffer module 22. On the other hand, the packet P1 would be dropped by the sorting module 12, because the packets P1 and P3 are competing with each other in the module 12 and the packet P3 has a priority. Therefore, under these assumptions the packet P3 wins the competition in the module 12 and is output to the buffer module 22. The packet P1 dropped by the sorting module 12 is inputted to the sorting module 13 and is output to the buffer module 22 without a competition.

Each of the sorting modules 11 to 1m comprises a sorting circuit 3, a dropping circuit 4 and a routing circuit 5. All of the input lines 101 are connected to the sorting circuit 3 of the first sorting module 11. The sorting circuit 3 sorts all of the packets simultaneously entered from the input lines 101, the sorting being according to of their destination addresses. Circuit 3 supplies them to n-data lines 102. If two or more packets have the same destination address, the dropping circuit 4 keeps one, drops the other competing packets, and supplies them to n-data lines 105. The kept packet and non-competing packets are output to n-data lines 103. The routing circuit 5 supplies the packets entered from the data lines 103 to the buffer modules corresponding to the output lines of their respective destination addresses via n-data lines 104.

The sorting modules 11 to 1m have a multi-line configuration. Among the m-sorting modules 11 to 1m, the module 11 is in the highest position. The module 1m is in the lowest position. The connection is arranged so that competing packets, dropped by the dropping circuit 4 of a superior module (the sorting module 11, for example), become the input to the sorting circuit 3 of the next immediately inferior module (the sorting module 12, for example).

Figure 2:
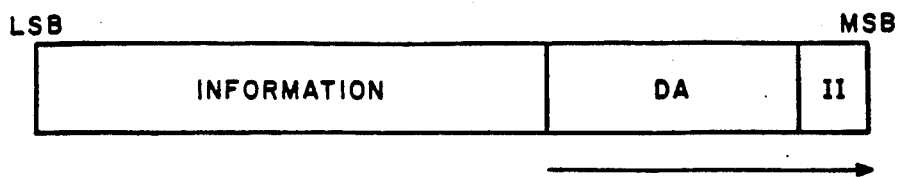
FIG. 2 illustrates one example of packet construction to be switched by the system according to the invention.

A packet entered into the sorting module 11, as illustrated in FIG. 2, has as its most significant bit an idle indication bit II indicating the presence of packet information, followed by destination address bits DA indicating the address of the output line and packet information in that order. A "0" for the idle indication bit II denotes the validity of the packet information. A "1" indicates the idleness of the packet whose packet information is invalid.

Figure 3:
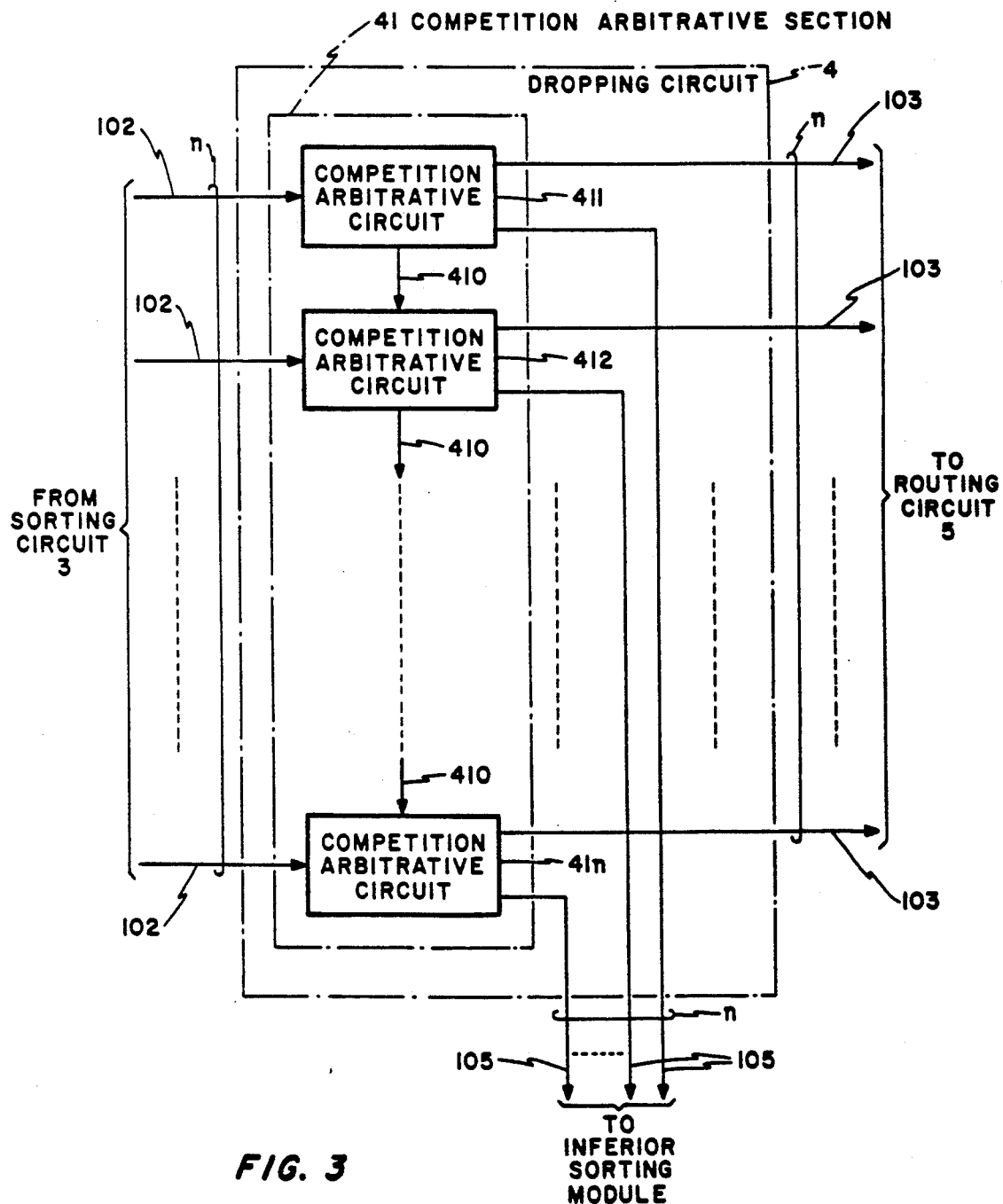
FIG. 3 illustrates in further detail a part of the preferred embodiment shown in FIG. 1.

The dropping circuit 4, as shown in FIG. 3, is composed of a competition-arbitrative section 41 comprising n-competition-arbitrative circuits 411 to 41n. The competition-arbitrative circuits 411 to 41n determine whether or not a given packet is to be dropped. The circuit 411 is in the highest position, and the circuit 41n, in the lowest position. Each of the competition-arbitrative circuits 412 to 41n is connected to an output line 410 for supplying, when a packet has been entered from a data line 102, the same packet; an output line 103 for supplying a packet which does not compete with the immediately superior packet; and a data line 105 for dropping the packet, if it does compete, and for supplying it to the immediately inferior sorting module.

Referring back to FIG. 1, the routing circuit 5 is to examine the destination address of the input packet and is for supplying it to one of the buffer modules 21 to 2n corresponding to the output line 108 to which it is to be sent. Each of its n-output lines 104 is connected to the buffer modules 21 to 2n, respectively. The routing circuit 5 is a non-blocking switch, so that no blocking takes place unless a plurality of packets are to be supplied to the same output line 104.

Here, in the inputting to the sorting circuit 3, a timing pulse indicating the packet input is supplied when a plurality of packets are simultaneously supplied from a packet synchronizing circuit (not shown) arranged in a preceding stage in the packet switching system. This timing pulse is supplied to a packet starting position designation line 111. These actions take place cyclically. Each of the circuits 3, 4 and 5, when outputting a packet, informs the next circuit of the arrival of the packet by supplying a timing pulse to packet starting position designation lines 112, 113, 115 and 114.

Each of the n-buffer modules 21 to 2n has an m-input m-output switching circuit 6, a buffer memory 7 having m-FIFO (first-in-first-out) buffers corresponding to m-lines 106, a selector 8 for selecting one out of m-output lines 107 of the buffer memory 7 and for connecting it to an output line 108, and a controller 9 for controlling the whole buffer module. The switching circuit 6 can be used, for instance, as an m×m space division switch.

Next will be described the operation of the sorting modules and buffer modules with reference to FIGS. 4 and 5.

Figure 4:
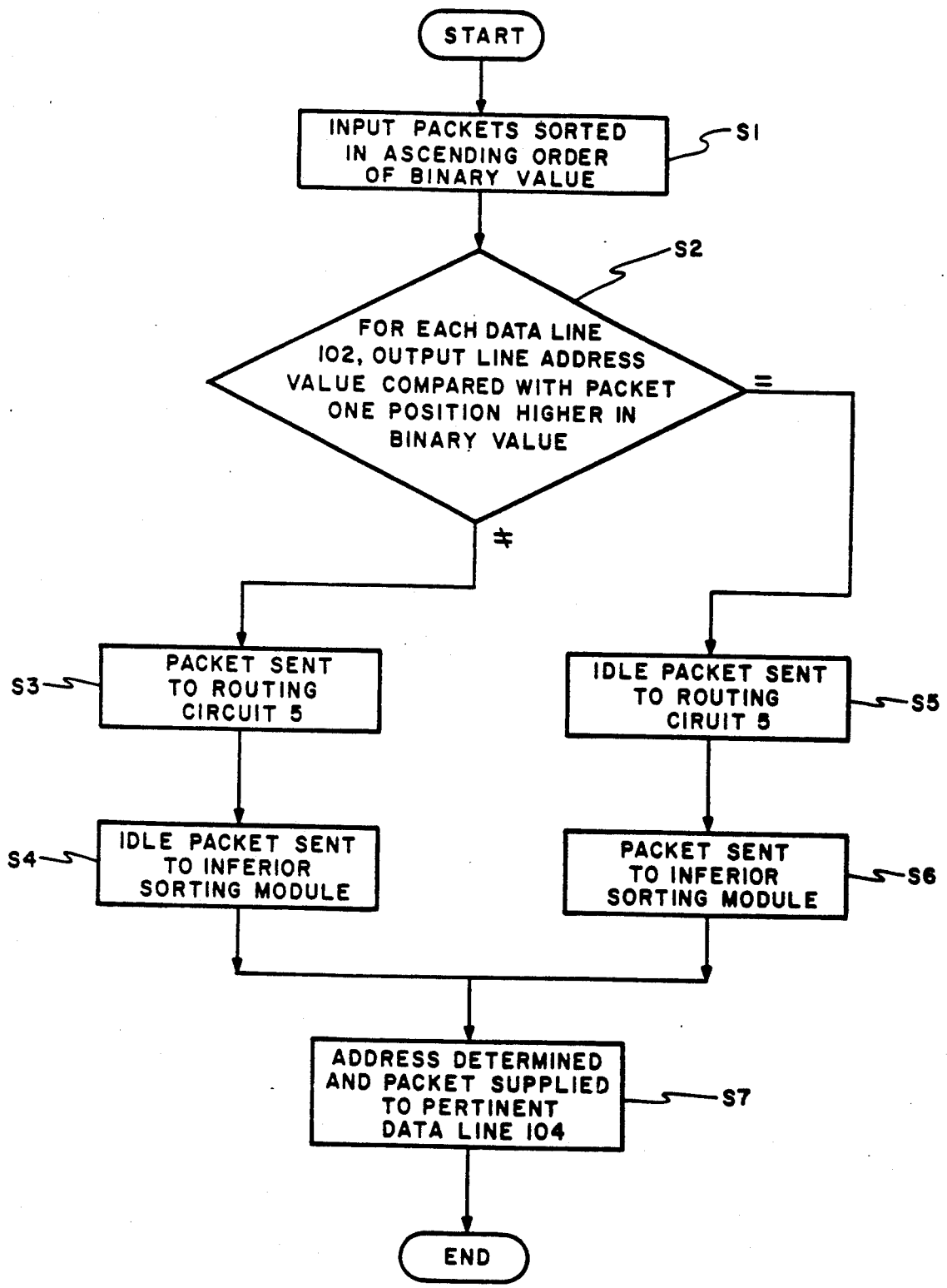
FIGS. 4 and 5 are flow charts for explaining the operation of the embodiment.
Figure 5:
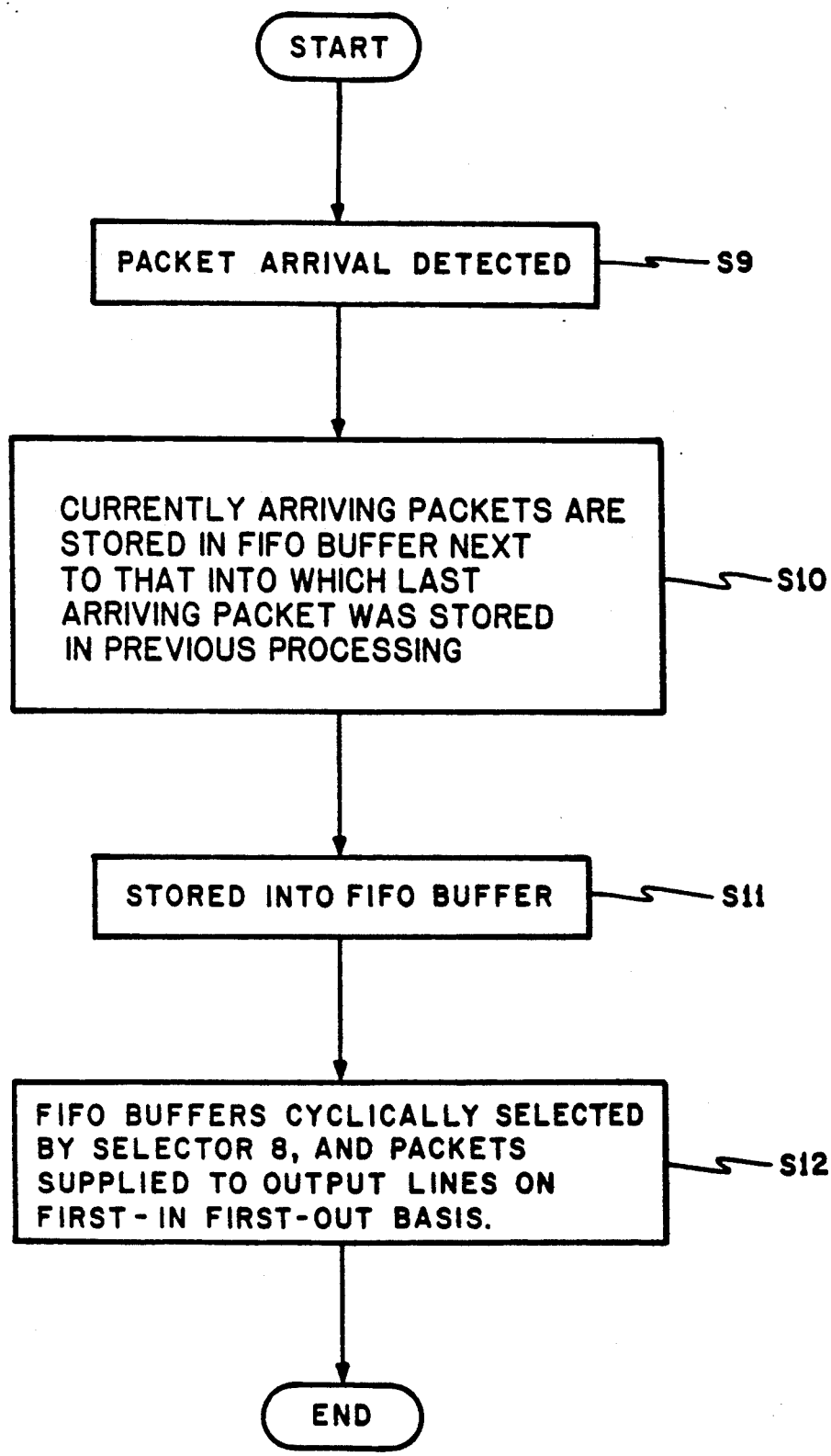

Referring to FIG. 4, first, a plurality of packets entered into the packet switching system are inputted to the sorting circuit 3 (FIG. 1) of the sorting module 11. The sorting circuit 3 sorts all of the packets in the ascending order of the binary value through a use of a bit-by-bit comparison (Step S1). In this preferred embodiment, the idle indication bit II is the most significant bit, which is "0" in a valid packet. The order of sorting is mainly determined by the address DA. If the number n of output lines is 64, the address will consist of six bits, so that, if "000000" denotes the No. 0 output line, "000001", the No. 1 output line, ..., and "111111", the No. 63 output line. The packet destined for the No. 0 output line will be sorted into the highest position. Among packets having the same address DA, the sorting order is determined by the binary value of the packet information section following the address DA. Packets sorted in this manner are supplied to the n-data lines 102 in the ascending order of the power. In this procedure, competing packets having the same address are always outputted together, adjoining one another.

Then, the sorted packets are entered into the competition-arbitrative sections 41 of the dropping circuit 4. In each of the competition-arbitrative circuits 412 to 41n, a packet whose position is immediately superior in the order of sorting is entered via the data line 410 from the immediately superior competition-arbitrative circuit. Its address is compared with that of the packet entered from the data line 102 (Step S2). If the packet is found to have the same address as the packet which is superior in the sorting order, it will be considered defeated in the competition. Otherwise the packet (the one entered from the data line 102) will survive. Surviving packets, which either are non-competing or have won the competition, are supplied to a routing circuit 5 via a data line 103 (Step S3). At this time, an idle packet whose idle indication bit II has been altered to "1" (with its address DA and packet information unchanged) is supplied to the immediately inferior sorting module 12 via the data line 105 (Step S4).

At Step S2, on the other hand, a packet defeated in the competition is dropped from the first sorting module 11 and entered into the second sorting module 12. Thus, in that one of the competition-arbitrative circuits 412 to 41n (FIG. 3) which determined the existence of competition, the packet entered from the data line 102 is supplied as it is to the data line 105. The idle packet whose idle indication bit II has been altered to "1" (with its address DA and packet information unchanged) is supplied to the routing circuit 5 via the data line 103 (Steps S5 and S6). In the competition-arbitrative section 41, the one packet having the smallest binary value among competing packets is kept. The rest are handled by inferior sorting modules. Then, n-packets outputted from the competition-arbitrative section 41 are entered into the routing circuit 5 (FIG. 1) via the data lines 103. The routing circuit 5 identifies the address DA of valid packets, and supplies them via the data lines 104 to the buffer modules 21 to 2n corresponding to the respectively desired ones of the output lines 108 (Step S7). This routing circuit 5 does not output any idle packet that may be entered.

Packets outputted to the data line 105 from the competition-arbitrative section 41 of the dropping circuit 4 are entered into the second sorting module 12. The sorting modules 12 to 1m also operate as charted in FIG. 4. In the sorting modules 12 to 1m, both valid packets and invalid packets (the idle packets) are indiscriminately entered into their sorting circuit 3. Accordingly, each sorting circuit 3 of the modules 12 to 1m also separates valid and invalid packets in its output. In the second sorting module 12, again, one packet out of the group of competing packets having the same address survives, and is supplied to the desired one of the buffer modules 21 to 2n. It should be noted here is that the packet entered from the second sorting module 12 to one of the buffer modules 21 to 2n always has a fixed delay from a packet entered from the first sorting module 11 to that one of the buffer modules 21 to 2n. Thus, the entery into one of the modules 21 to 2n from the module 12 is delayed by the processing time taken by the second module 12. Therefore, no more than one packet is ever entered simultaneously into the same buffer module.

Now will be described the operation of the buffer modules 21 to 2n with reference to FIG. 5. Packets having arrived from the sorting modules 11 to 1m (FIG. 1) are entered into the switching circuit 6. The controller 9 detects the arrival of a packet according to the timing pulse 114 (Step S9), and controls the switching circuit 6 so as to store the packet into an unoccupied buffer memory 7 (Steps S10 and S11). Thus the number of the FIFO buffers in the buffer memory 7 is equal to the number m of the sorting modules 11 to 1m.

The packets which were competing when they are entered into the first sorting module 11 arrive at the same switching circuit 6 in the ascending order of the binary value. They arrive at intervals, each of which is equal to the aforementioned delay therefore, they are stored into the FIFO buffers in a predetermined sequence. Suppose, for instance, that the Nos. 1 to m FIFO buffers are to be used in this order and that the final packet out of the group of competing packets processed according to the preceding timing pulses 114 is stored into the No. (m−2) buffer memory. This group of competing packets is processed according to the present timing pulses 114 will be cyclically stored, as they arrive, into the FIFO buffers, starting with No. (m−1) and followed by No. m, No. 1, No. 2 and so forth in this order. The switching circuit 6 performs its switching at a timing equivalent to the length of one packet. Thus once a path is established for packet storing, it is held until all of the packet has been stored into the FIFO buffer. The group of competing packets stored sequentially in this manner await reading.

The controller 9 cyclically reads the packets out of the buffer memory 7 in an order which is the same as the order in which they were stored. Controller 9 controls the selector 8 in synchronism with this reading, and sequentially supplies the group of competing packets to the output line 108 (Step S12).

Figure 6:
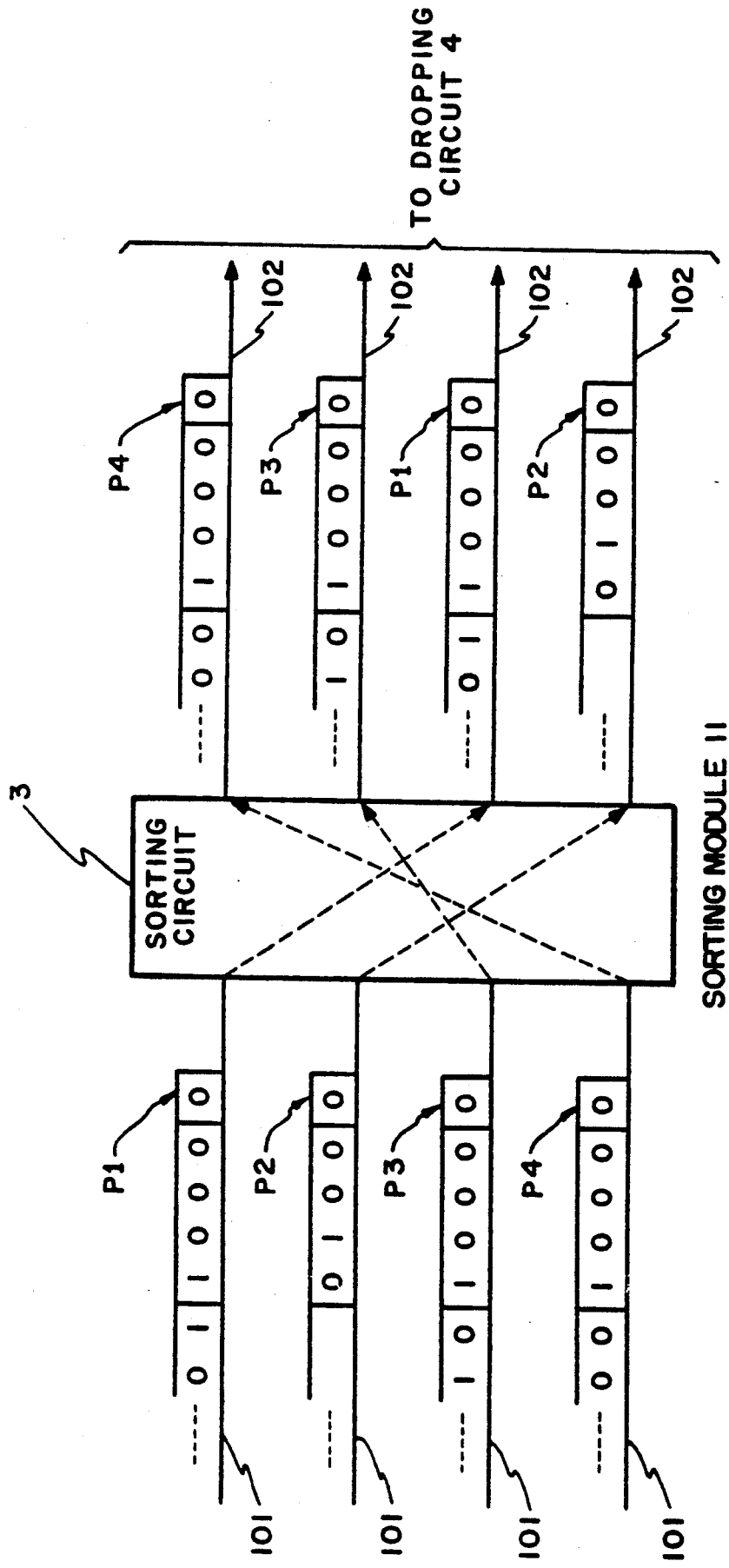
FIGS. 6 to 10 are diagrams for explaining an example of the operation of the embodiment.

Now will be described the overall operation with reference to a specific example. It is supposed here, for the sake of simplified description, that n=4, m=3 and, as shown in FIG. 6, four packets P1 to P4 are simultaneously supplied to the input lines 101. The addresses of the packets P1 to P4 are "1", "2", "1" and "1", respectively, so that the packets P1, P3 and P4 are competing with one another. These packets are sorted by the sorting circuit 3 (FIG. 1) of the first sorting module 11. The packets P1, P3 and P4 which are destined for the same address are rearranged into the ascending order of the binary value of packet information, i.e. P4, P3 and P1.

Figure 7:
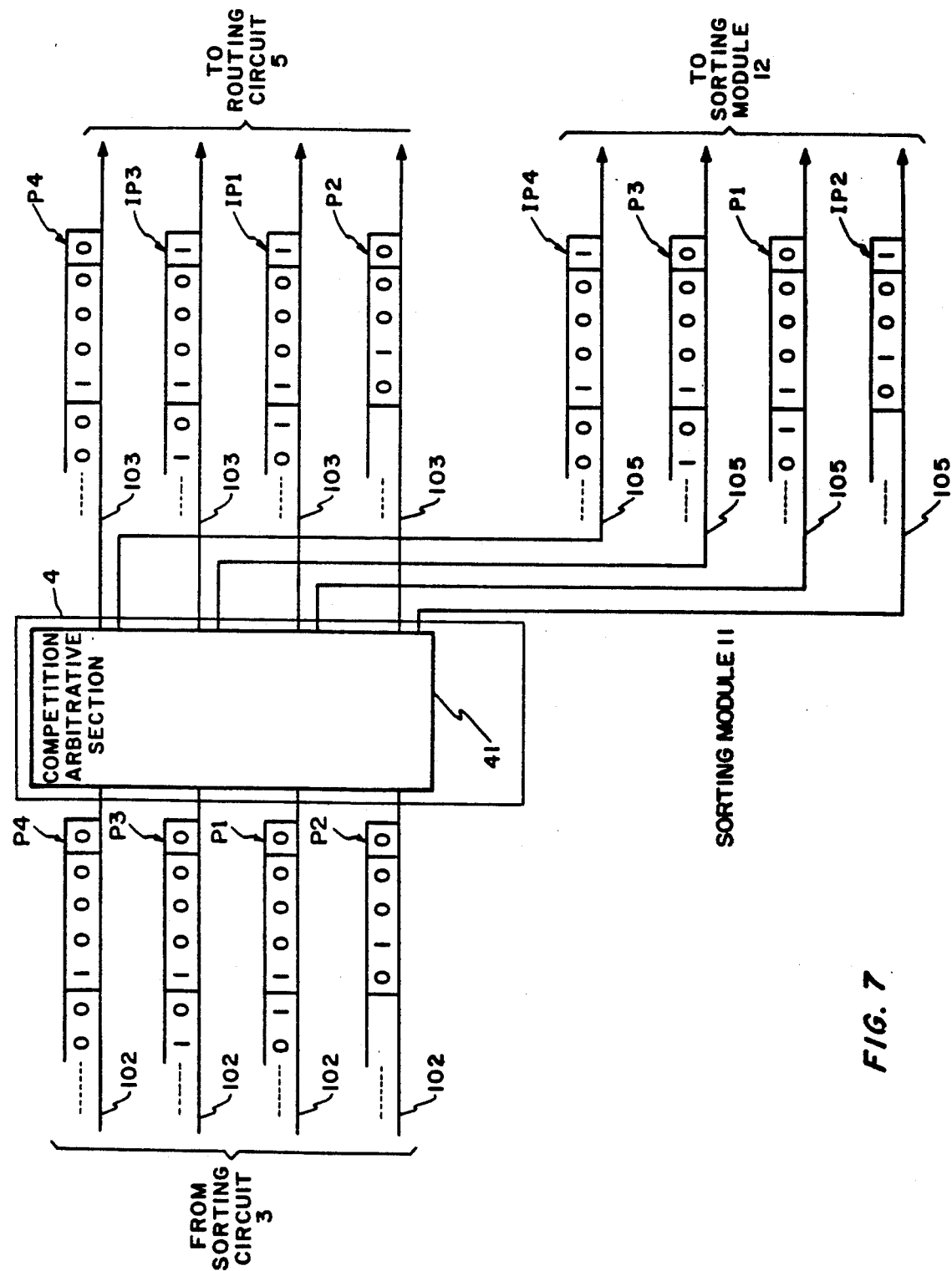
Figure 8:
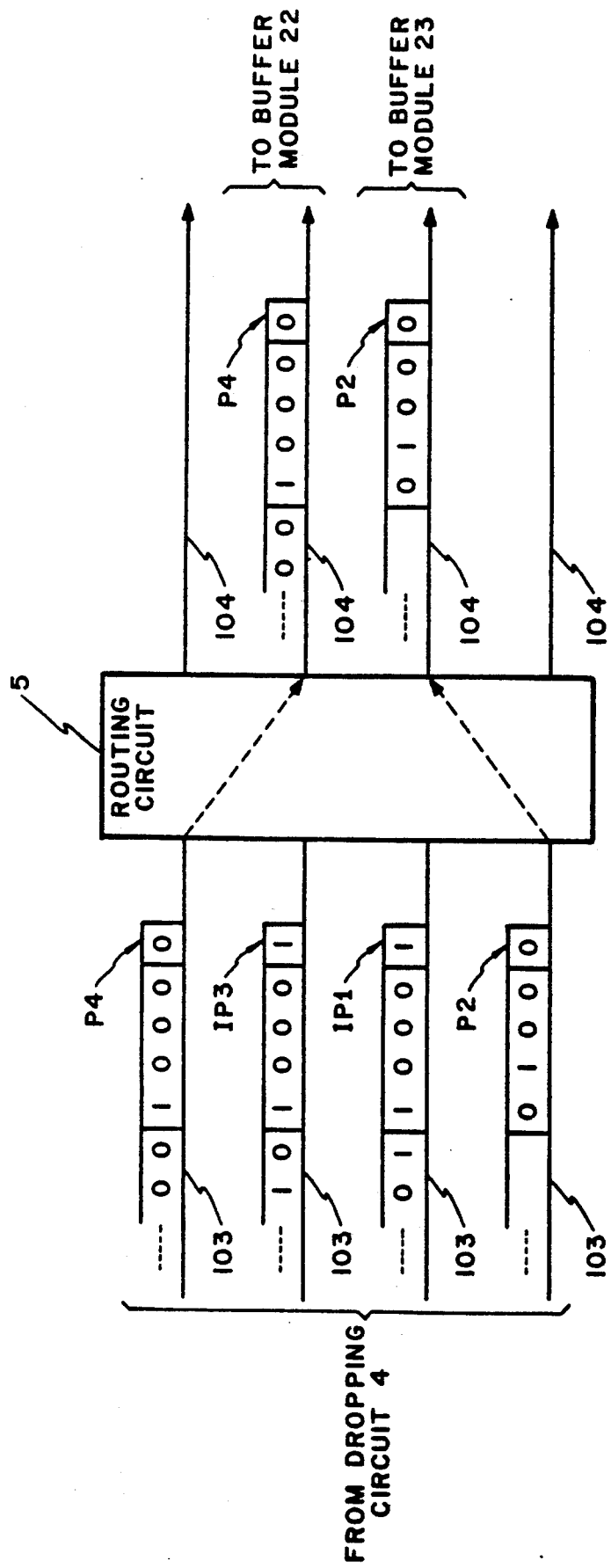

Next, referring to FIG. 7, the sorted, packets are entered into the competition-arbitrative section 41 (FIG. 3). From here, the packet P4 which has won the competition and the non-competing packet P2 are outputted to the routing circuit 5 (FIG. 1). At this point, the idle packets IP4 and IP2 of the packets P4 and P2, respectively, are supplied to the data lines 105. The packets P3 and P1, having been defeated in the competition, are dropped from the first sorting module 11 and supplied to the data lines 105. At this point, the idle packets IP3 and IP1 of the packets P3 and P1, respectively, are supplied to the data lines 103 leading to the routing circuit 5. As a result, the packets P4 and P2, and the idle packets IP3 and IP1 are entered into the routing circuit 5 of the first sorting module 11.

Then in the routing circuit 5, the packet P4 is routed to the buffer module 22 (not shown, but the next buffer module after 21 in FIG. 1) corresponding to the second output line indicated by the address "1" of this packet, and the packet P2, to the buffer module 23 (not shown, the second buffer down, after 21, in FIG. 1) corresponding to the third output line indicated by its address "2". As already stated, neither the idle packet IP3 nor IP1 is outputted.

Figure 9:
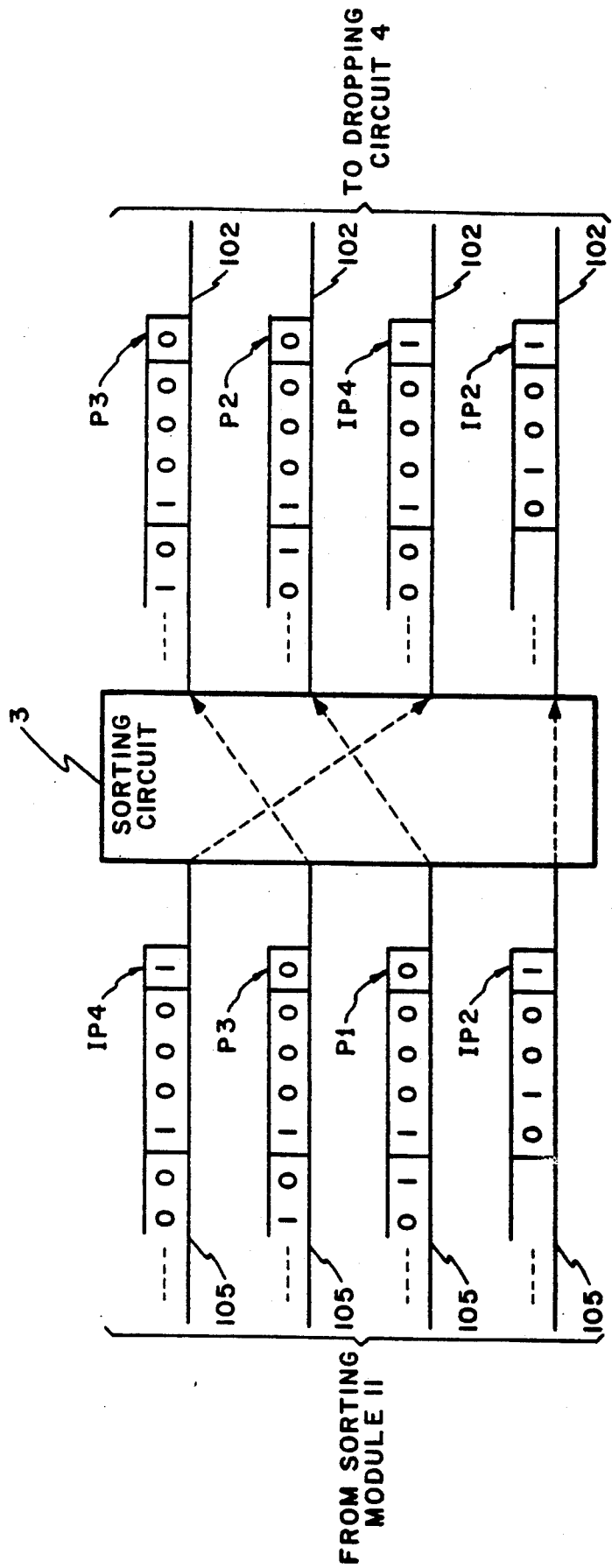

The packets P3 and P1 and the idle packets IP4 and IP2, as illustrated in FIG. 9, are supplied to the second sorting module 12, where they undergo processing similar to what takes place in the first sorting module 11. Eventually, the packet P3 survives the processing by the second sorting module 12, and is supplied to the buffer module 22. The packet P1 is again dropped by the second sorting module 12, and supplied from the third sorting module 13 to the buffer module 22.

As shown in FIG. 6, the packets P1 to P4 are simultaneously inputted to the sorting module 11. The packets P4 and P2 are then supplied from the sorting module 11 to the buffer modules 22 and 23, respectively. Since the packet P4 is assumed to have won the competition between the packets P1 and P4, the packet P2 is not involved in a competition. On the other hand, the packet P3 is dropped out of the sorting module 11, passed to the module 12 and from there, supplied to the destination buffer module 22.

The time necessary for a passage of one sorting module is equal to the delay time D. Therefore, the packet P3 experiences a delay of "D" as compared to the packet which passes through only a single module. Thus, as it passes through two sorting modules 11 and 12 the delay is "D". In this situation, the packet P3 arrives at buffer module 22 lagging by a timer period D behind the packet P4 which is passed through only one sorting module 11. Similarly, the packet P1 is passed three sorting module 11, 12 and 13. Therefore, it arrives at the buffer module 22, lagging by the period 2D behind the packet P4 which passes through only a single module.

Figure 10:
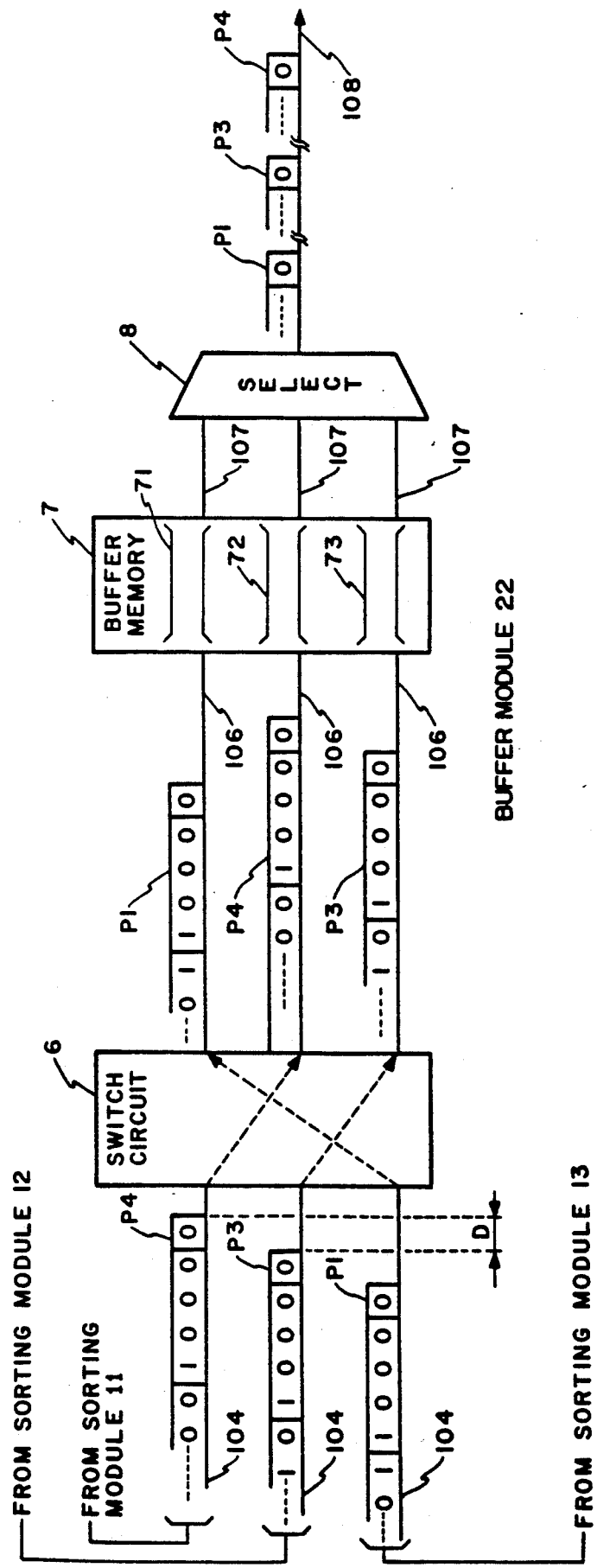

Next will be described, with reference to FIG. 10, the buffer module 22 where the competing packets P4, P3 and P1 successively arrive. Into the switching circuit 6 are entered the packets P4, P3 and P1 in this order. The input delay time D of the packet P3 behind the packet P4 is due to the former's passage of one extra stage of sorting module. Similarly, the packet P1 arrives 2D behind the packet P4. It is supposed in this case that the final packet of the previous group of competing packets has been stored into the FIFO buffer 71. Therefore, the controller 9 so controls the switching of the switching circuit 6 as to store the current group of competing packets cyclically into the FIFO buffers beginning with the FIFO buffer 72. Thus, the packets P4, P3 and P1 are stored into the FIFO buffers 72, 73 and 71, respectively. After that, the selector 8 supplies these packets to the output line 108 on the first-in first-out basis, so that the competing packets P4, P3 and P1 are smoothly supplied to the respectively desired output lines.

Incidentally, if the arrival of the packet P1 at the buffer module 22 is too long delayed to precede that of the first packet among the group of packets to be entered into the sorting module according to the timing pulse on line 111 next to the packets P1 to P4, the sequence of packets on the same input line may not be preserved. Therefore, in order to maintain the proper order of packets, the maximum delay (m−1)·D between those in the highest and lowest positions among competing packets should be made shorter than one packet length.

Further, since the maximum possible number of competing packets is n, the number m of sorting modules should not be greater than n. However, this number m and the capacities (depths) of individual FIFO buffers are set according to the maximum packet loss probability in a given packet switching system.

What is claimed is:
1. A packet switching system comprising:
   on its input side, m-sorting modules, where m is a positive integer, and 2≦m, each having sorting means for sorting a plurality of packets entered simultaneously from n-input lines, where n is a positive integer, and 2≦n, according to the destination address; dropping means for, keeping one of the competing packets and dropping the rest to a sorting module in an inferior position if there are a plurality of competing packets having the same destination address among the packets sorted by the sorting means; and routing means for routing each packet passed the dropping means on the basis of the destination address;
   said m-sorting modules comprising a first sorting module, a second sorting module, ..., and an m-1-th sorting module and each being in a first superior position, a second superior position, ..., a second inferior position and a first inferior position respectively, and said m-sorting modules being coupled in cascade connection to input a dropped packet outputted from said dropping means of the sorting module in a superior position into the sorting means of the sorting module in a next inferior position toward said sorting module;
   buffer modules for temporarily storing the packets entered from said routing means of said m-sorting modules and supplying them to output lines of the packet switching system on a first-in first-out basis, each buffer module being connected to an output line corresponding to said destination address, whereby said plurality of packets are initially entered into the first sorting module in the first superior position, non-competing packets are distributed from said first sorting module to the buffer modules corresponding to the output lines indicated by said destination addresses, the k-competing packets, where k is a positive integer, and 2≦k≦n are entered into the same buffer module with predetermined delays in sequence from the highest-positioned sorting module to the k-th sorting module.

2. A packet switching system, as claimed in claim 1, wherein said dropping means has a dropping circuit for keeping the highest-positioned packet in an order of sorting amount competing packets by sequentially judging the destination addresses of packets which follow each other in the order of sorting and for dropping the lower-positioned packet in the order of sorting between the competing packets which have the same destination address.

3. A packet switching system, as claimed in claim 2, wherein said sorting means sorts a plurality of simultaneously entered packets in an ascending order of the binary value of said packets.

4. A packet switching system, as claimed in claim 2, wherein each of said packets has as its most significant bit information indicating validity or invalidity of the packet and said dropping circuit supplies, in place of each packet dropped in the competition, a packet which is the same as the corresponding dropped packet except that said information is replaced with information indicating invalidity.

5. A process for switching packets of data information, each packet including an address defining the destination of the data packet, the process comprising the steps of:
   (a) receiving incoming data packets at an input circuit;
   (b) sorting a plurality of packets having the same address which are simultaneously competing for attention at a sorting module, the packets being sorted as they are received on a basis of the addresses of the received packets;
   (c) selecting one of said packets sorted at the sorting module according to step (b) and forwarding the selected sorted packet toward its destination;
   (d) transferring the non-selected ones of said competing packets to another sorting module for again sorting and selecting one of said competing packets according to steps (b) and (c);

(e) repeating step (d) until substantially all of said competing packets have been sorted and forwarded; and (f) buffer time storing said forwarded packets in order to release them in a smooth and orderly form.

6. The process of claim 5 and the step (b) further comprises the step of (b1) sorting the competing packets on a basis of an ascending order of binary address values.

7. The process of claim 5 and the step (c) further comprising the step of (c1) making said selection on a basis of a highest positioned packet address among the addresses of said competing packets, and dropping packets having a lower positioned packet address.

8. The process of claim 7 further comprises the step of (g) indicating a validity or invalidity of a packet by its most significant information bit.

9. The process of claim 8 further comprises the step of (h) changing said most significant bit from valid to invalid when said packet is dropped.

10. A system for switching information packets, wherein each information packet has its own address, said switching system comprising:

a plurality of sorting modules, each of said sorting modules comprising in a cascaded sequence a sorting circuit, a dropping circuit arranged in a hierarchial order, and a routing circuit, said sorting circuit sorting the information packets entered simultaneously according to the address, said dropping circuit keeping one of the competing packets and dropping the rest, and said routing circuit routing each packet passed the dropping circuit on the basis of the address;

means for coupling the dropping circuit in one of said modules to a sorting circuit in the next succeeding one of said modules, thereby creating a cascaded hierarchical order extending from a superior to an inferior sorting module, the superior sorting module being coupled to receive incoming information packets;

means for selecting one from a number of packets having the same address which are competing for simultaneous attention and for passing the non-selected remainder of said information packets to the sorting circuit which is next in said hierarchical order, a plurality of switching means associated with said plurality sorting molecules and responsive to said routing circuits for selectively forward said information packets according to said packet addresses; and means for buffer time storing said packets in order to smoothly forward them to their destinations.

11. The system of claim 10 wherein said buffer time storing means operates on a first in first out basis.

12. The system of claim 11 further comprises means for identifying some of said packets which reach an inferior sorting module as invalid packets.

13. The system of claim 10 wherein said sorting modules sort the competing packets according to the binary value of said data packet addresses.

* * * * *